United States Patent
Hastings

(10) Patent No.: US 7,361,375 B2
(45) Date of Patent: Apr. 22, 2008

(54) FISH CHUM SYSTEM AND PROCESS FOR MAKING SAME

(76) Inventor: Samuel J. Hastings, 1514 NW. 17th Crt., Crystal River, FL (US) 34428

( * ) Notice: Subject to any disclaimer, the term of this patent is extended or adjusted under 35 U.S.C. 154(b) by 492 days.

(21) Appl. No.: 11/184,481

(22) Filed: Jul. 19, 2005

(65) Prior Publication Data

US 2005/0252068 A1 Nov. 17, 2005

Related U.S. Application Data

(62) Division of application No. 10/737,683, filed on Dec. 16, 2003, now Pat. No. 6,955,006.

(51) Int. Cl.
*A23K 1/18* (2006.01)

(52) U.S. Cl. .......................................... 426/1

(58) Field of Classification Search ..................... 426/1
See application file for complete search history.

(56) References Cited

U.S. PATENT DOCUMENTS

| | | | | |
|---|---|---|---|---|
| 2,358,320 | A * | 9/1944 | Eisaman | 424/442 |
| 2,844,907 | A * | 7/1958 | Merton | 43/44.99 |
| 2,904,436 | A * | 9/1959 | Auerbach | 426/635 |
| 3,876,803 | A | 4/1975 | Stephan et al. | |
| 3,931,414 | A | 1/1976 | Popeil | |
| 3,931,415 | A | 1/1976 | Larsen et al. | |
| 3,987,205 | A | 10/1976 | Stephan et al. | |
| 4,393,087 | A * | 7/1983 | Sullins et al. | 426/74 |
| 4,513,657 | A | 4/1985 | Melancon | |
| 4,563,832 | A | 1/1986 | Drebot | |
| 4,634,592 | A | 1/1987 | Faber et al. | |
| 4,666,717 | A | 5/1987 | Smith et al. | |
| 4,731,247 | A | 3/1988 | Wolford et al. | |
| 4,809,455 | A | 3/1989 | Smart | |
| 4,826,691 | A | 5/1989 | Prochnow | |
| 4,998,370 | A | 3/1991 | Lawler et al. | |
| 5,033,227 | A * | 7/1991 | Coxwell | 43/44.99 |
| 5,071,659 | A | 12/1991 | Shumaker | |
| 5,089,277 | A | 2/1992 | Prochnow | |
| 5,128,153 | A * | 7/1992 | Axelrod | 426/2 |
| 5,333,405 | A | 8/1994 | Bowles | |
| 5,773,051 | A * | 6/1998 | Kim | 426/1 |
| 6,009,657 | A | 1/2000 | Morton et al. | |
| 6,143,333 | A | 11/2000 | Lanter et al. | |
| 6,298,595 | B1 | 10/2001 | Friedlob | |
| 6,391,295 | B1 | 5/2002 | Novitsky et al. | |
| 6,426,101 | B1 * | 7/2002 | Kurzinger et al. | 426/2 |
| 2002/0142067 | A1 | 10/2002 | Hanson | |
| 2003/0066231 | A1 | 4/2003 | Ollis et al. | |

FOREIGN PATENT DOCUMENTS

| | | |
|---|---|---|
| JP | 2001-204355 | 7/2001 |
| JP | 2002-238424 | 8/2002 |
| JP | 2002-345383 | 12/2002 |

* cited by examiner

*Primary Examiner*—C. Sayala
(74) *Attorney, Agent, or Firm*—Dennis G. LaPointe

(57) ABSTRACT

A blended fish chum system using dry fish food modified for buoyancy to either provide for a desired floating characteristic or a desired sinking characteristic. Fish oil is added to the fish food used for floating characteristics and fish oil is added to the fish food used for sinking characteristics. A starter fish chum comprising sinking fish food to which crustacean oil is added, is mixed with the combination of sinking fish food and fish oil. The floating fish food mixture, which has been dried, is blended with the sinking fish food mixture, which has also been dried, to form the blended fish chum. The mixture ratio is varied to achieve desired floating or sinking characteristics of the resultant blend. The resultant blended fish chum is added to a self regulating mesh bag with its clip/draw string, which is vacuum sealed to ensure freshness and long term dry, non-refrigerated storage.

16 Claims, 3 Drawing Sheets

FISH CHUM SYSTEM AND PROCESS FOR MAKING SAME

RELATED APPLICATION

This application is a divisional of U.S. patent application Ser. No. 10/737,683 filed Dec. 16, 2003 now U.S. Pat. No. 11/184,481.

FIELD OF THE INVENTION

The invention relates to a new and improved Chum bait system and process for making the system and its uniquely blended composition.

BACKGROUND OF THE INVENTION

One of the problems with chum that is commercially available today is there is a lot of waste and once the chum is purchased, it cannot be stored without refrigeration. Thus, it is easier to dispose of it than to try to keep it for re-use. Refrigeration with its required source of electricity, is needed just to store the chum. Existing chum can be purchased in a frozen block form, but should be maintained in this frozen state until ready for use; otherwise, the thawed chum begins to spoil.

The present invention is based on this underlying recognition of a need for an effective all-inclusive fish chum system, where the chum does not require electricity for refrigeration or ice and that can be stored for long periods of time anywhere. The result was the development of a fish chum incorporated in a packaging system for facilitating its storage and eventual dispersion in the water. Further, the chum product developed is not messy and does not smell.

The present invention can be used on fresh or salt-water fish. The novel fish chum system gives the fisherman freedom and choice to use or not to use. The fisherman can keep the fish chum system close by his hook. In one embodiment, the packaging components allows for the fish chum system to be refilled easily any time anywhere with no mess. However, once used, the fisherman will have to re-seal the fish chum system, or at least place it in a sealable/closable poly-bag. The invention is effectively an all-inclusive fish chum system in a kit ready to drop in the water. The mesh bag incorporated in the invention allows for the self-regulating dispersion of the chum so as not to waste fish chum.

SUMMARY OF THE INVENTION

The present invention includes a method of or process for combining dry fish food with fish oil and crustacean oils. The end product is a complete fish chum kit that is self-regulating and that gives a fisherman total control of fish chumming results, without the need of additional steps such as adding fish oil, water for mixing, or the need to put the chum in a bag suitable for chumming, as is necessary with other chums.

A special chum dispersion self-regulating slotted mesh bag obtains this controlled release. The fish chum system is preferably vacuumed packed so that it doesn't need electricity for refrigeration or ice to store it. That is, the novel chum system can be stored anywhere, anytime and plenty can be kept on hand without spoiling.

A self-regulating slotted mesh bag can be refilled with the different chum types available. The chum system can be used on boats, docks, piers, and bridges and can even be used for trolling or drifting. It is great for freshwater or saltwater and fish and crab traps. This all-inclusive fish chum system, with its special blends, is ready to use, versatile and economical, whereas other products fall short of all of these options.

The important novel packaging components includes a special polyethylene slotted mesh bag with drawstring. The bag has self-regulating slots that are vertical top to bottom of the bag. When the fish chum bag is put in the water, the pulsation of the water action opens and closes these slots thus letting out small amounts of fish chum. Manually pumping the chum bag lets out a larger amount as needed thus giving the fisherman total control of the chumming results. When the water currents are strong or trolling the weight of the chum in the bag pulls the bag straight causing the slots to close, smaller amount of chum is let out. This action means that the chum bags last just as long in strong currents as it does bobbing up and down next to an anchored boat. The fisherman therefore maintains total control of these actions.

Further, a heavy-duty vacuum pouch (preferably about 5 mil) contains the novel special fish chum blend, which is in turn contained in the slotted mesh bag. The slotted mesh bag further includes a plastic snap clip. The chum, bag and clip are vacuumed-sealed for freshness and an extended shelf-life. This special fish chum system is an all-inclusive kit and ready for use. Again the fisherman has total control of his chumming needs with the availability of this chum kit.

Where this system not only eliminates the need for electricity, refrigeration, or ice, it can be stored in any tackle box. The mixture ratio is varied to achieve desired floating or sinking characteristics of the resultant blend. The resultant blended fish chum is added to the self regulating mesh bag with its clip and draw string, which allows the chum to disperse at different rates depending on the water conditions. This handy all-inclusive unit gives the fisherman total control of his chumming without the need to add any additional ingredients. The chum bag is vacuum sealed to ensure freshness and long term dry, non-refrigerated storage.

DETAILED DESCRIPTION OF THE INVENTION

Figure 1:
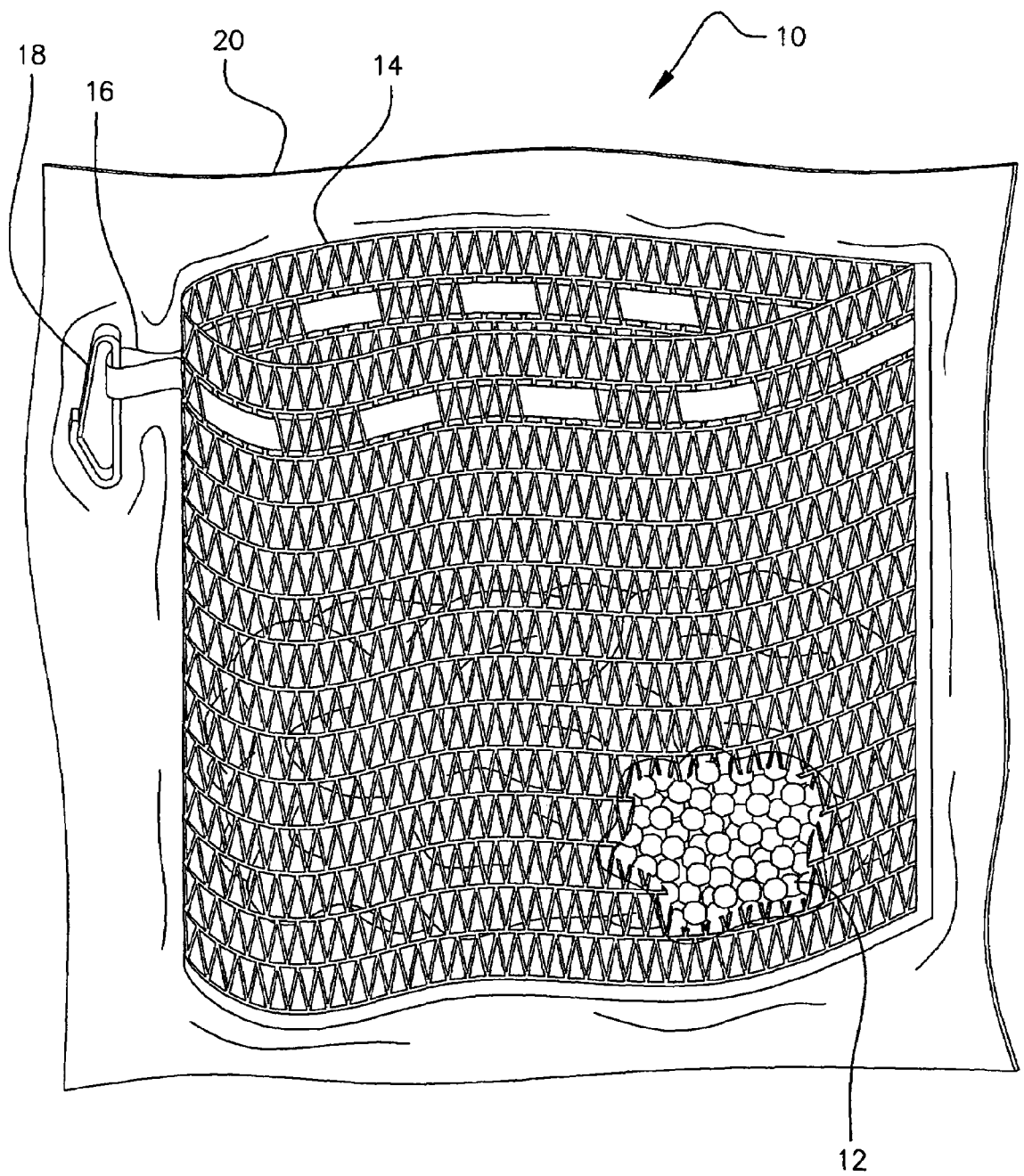
FIG. 1 is a schematic representation of the invention.
Figure 2:
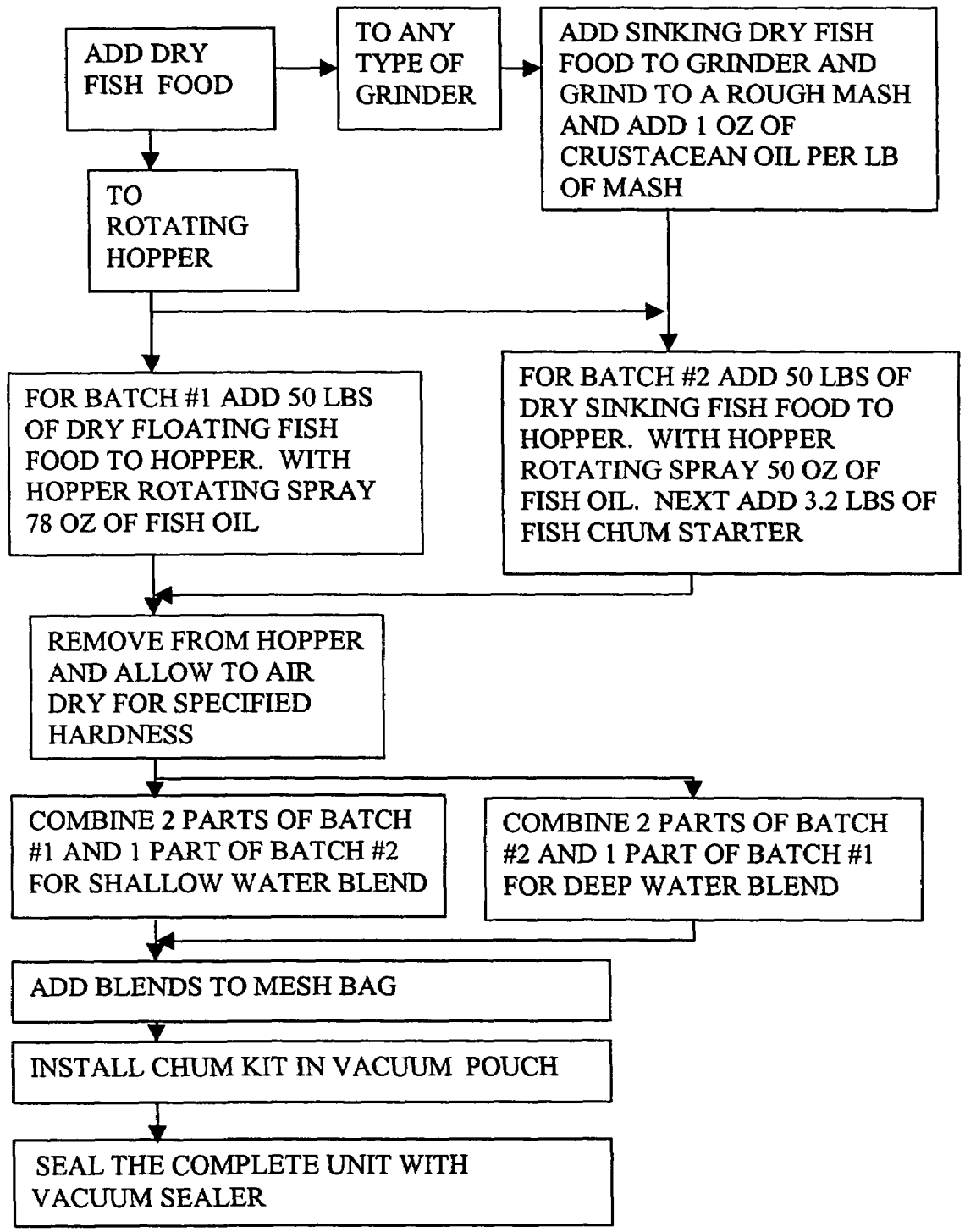
FIG. 2 is a schematic representation of an example of a typical process for making the chum.
Figure 3:
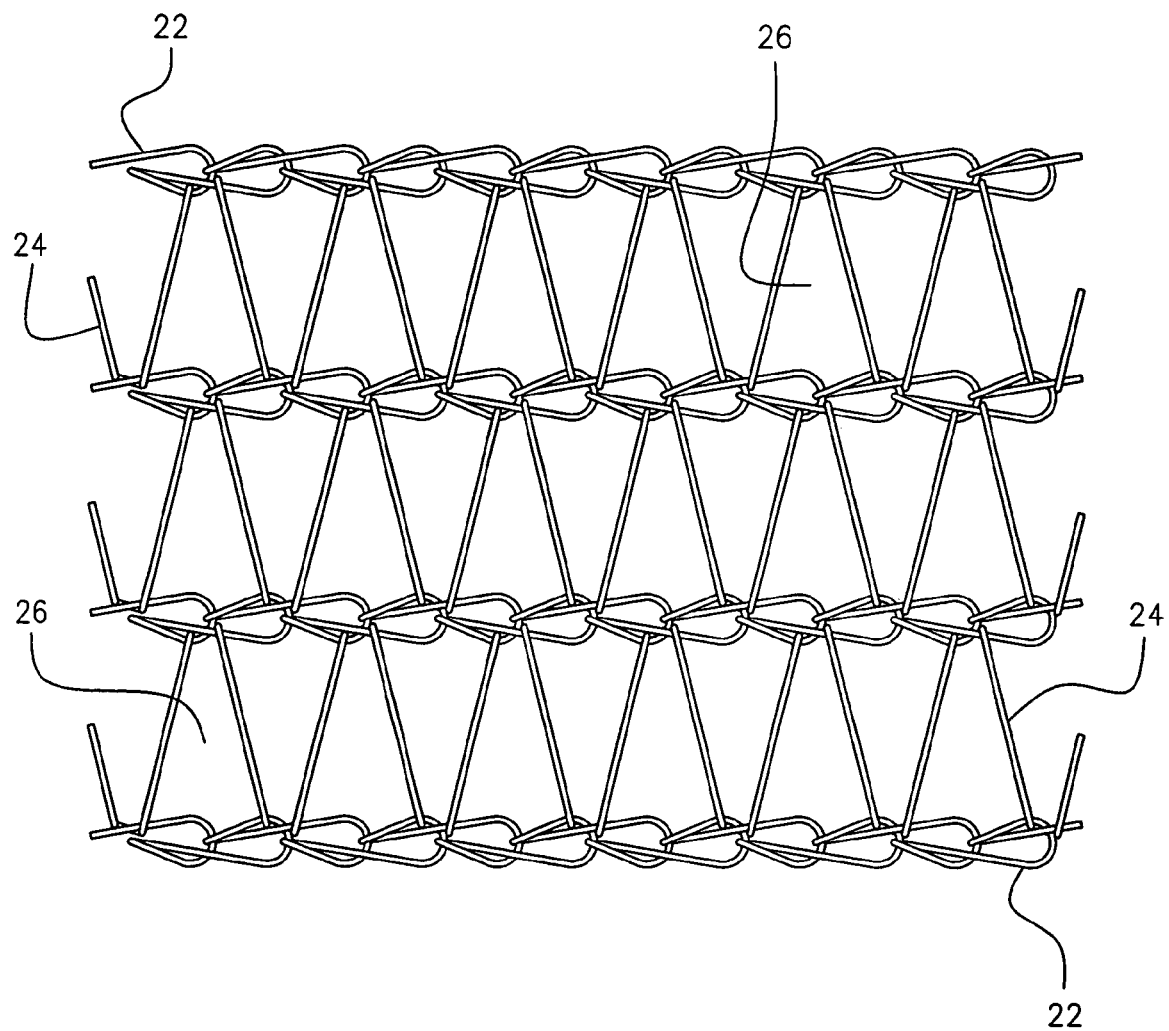
FIG. 3 is an exploded partial view of the mesh bag depicting the filament configuration between the circumferential cords of the bag.

Referring now to the drawings, FIG. 1 discloses the present invention, the chum system, depicted generally as 10, and an example of making the system 10, as depicted in the process chart schematically depicted in FIG. 2. FIG. 3 is an exploded partial view of the mesh bag 14 depicting the filament 24 configuration between the circumferential cords 22 of the bag 14.

Before describing a typical example of the process, it should be understood what certain components referred in the process are typically comprised of. For example, dry fish food is used in the process. Although the ingredients of dry fish food can vary, depending on the manufacturing source, the dry fish food used by the inventor herein is consistent with a product commercially available from as the F-R-M® Clover Brand from Flint River Mills, Inc. of Tallahassee, Fla.

According to the ingredients listing for this brand, this dry fish food has crude protein—minimum 32.000%, crude fat—minimum 2.505%, crude fiber—minimum 6.000%, and crude fiber—maximum 12.000%. It includes soybean meal, corn meal, wheat middling, fish meal, meat and bone meal, alfalfa meal, salt, dicalcium phosphate, vitamin A, vitamin D-3, vitamin E, L-ascobyl-2 polyphosphate, ascorbic acid, riboflavin, pantothenic acid, niacin, vitamin B-12, choline chloride, menadione, sodium bisulfate, thiamin, mononiticate, pyridoxine hydrochloride, folic acid, manganous oxide, calcium iodate, copper oxide, cobalt carbonate, zinc oxide, ferrous carbonate, sodium selenite, fish oil, and ethoxyquin. Certainly, one can recognize that not all these ingredients are really necessary to provide an adequate fish food. They are only provided as an example of the listed contents on the packaging for one satisfactory fish food commercially available to date.

References to "sinking" fish food and "floating" fish food are made herein below in the description and in the claims. Flint River Mills, Inc., makes available both types of dried fish food, which are typically available in bulk in 50 pound bags. The dried fish food with floating characteristics is essentially packed not as dense as the sinking version. That is, it is "airy" or light so as to be able to float, that is, provide some measure of buoyancy. The sinking version is more densely packed as a solid and hard form. This characteristic allows it to sink. Otherwise, the ingredients are essentially similar to those typical ingredients described above for the commercially available dried fish food available from the Flint River Mills company.

Although there are several fish oils that would work well with the inventive process and invention, a preferred fish oil is 100% pure Manhaden fish oil. Similarly, crustacean oils are also common and readily available on the commercial market.

The following is an example only for making a typical batch of the chum 12, for shallow water and deep water use. Different percentages and ingredients may be used to provide for certain performance features such as depth; however, the following process is an example of a very satisfactory process, where the performance of the invention 10 was deem very effective.

Example of Chum Blending Process

Referring to FIG. 2, dry fish foods of two types are used for the base, to facilitate achieving either the desired floating or sinking characteristics. A substantial amount of time was used in testing and blending these two types to achieve the desired blends for the desired performance. The blending is typically done in a rotating hopper, not shown in the figures.

For batch no. 1, about 50 lbs of floating dry fish food was used. The floating fish food was added to a rotating hopper. About 78 oz of pure 100% Menhaden fish oil was added by spraying the fish oil over the dry fish food. Batch no. 1 was removed from hopper and allowed to air dry to achieve a specified or desired hardness.

For batch no. 2, about 50 lbs of sinking dry fish food was placed in the rotating hopper. About 50 oz of 100% pure Menhaden fish oil was added by spraying the fish oil over the dry fish food. Before this batch was removed, about 3.2 lbs of fish chum starter was added. Batch no. 2 was then removed and allowed to air dry to achieve a specified or desired hardness.

The fish chum starter was made by grinding dry sinking fish food in any type of grinder to a rough mash. To the rough mash, crustacean oil was added by spraying the crustacean oil at a rate of about 1 to 1.5 oz per pound of mash, and the oil/mash combination was then allowed to air dry. The chum starter is important as it releases chum right away when put in water while the larger chum blends soak up water in about 20 minutes until the chum is soft enough to start releasing chum.

One pound of this unique blend of chum expands in water to about 4 lbs and two to three times its dry size. The two batches were blended together for a desired blend, as described below.

The shallow water fish chum blend is recommended for water depths up to 20 feet. The preferred blend for this shallow water performance characteristic was achieved by mixing 2 parts floating mix and 1 part sinking/chum starter mix per pound of total mixture.

The deep water fish chum blend is recommended for a water depth of 20 feet or more. The preferred blend for this deep water performance characteristic was achieved by mixing 2 parts sinking/chum starter mix and 1 part of floating mix per pound of total mixture.

For each blend selection made, the selected blend is placed into a self-regulating slotted mesh bag 14 with a pull cord or draw string 16 and snap clip 18. These components will be further described below.

The chum kit is installed in pouch 20, which is vacuum-sealed. The kit or invention 10 is vacuum-sealed for freshness and longevity. This resultant vacuumed sealed kit 10 gives the fisherman the freedom to choose when to use the chum, anytime, anywhere, without the need to add any additional ingredients. No worries like frozen chums that need ice or refrigeration to keep the chum fresh. This kit can be stored anywhere with out the use electricity. This is also an economical money saving factor for the retailer.

Below is another example of recipes for 100 lbs of chum (per blend) using a process similar to that described above:

Shallow Water Blend (Floating):
    63 lbs floating fish food
    31 lbs sinking fish food
    1 gallon fish oil
    6 lbs chum starter (a crushed fish food with 6 oz of shrimp or crustacean oil)

Deep Water Blend (Sinking):
    63 lbs sinking fish food
    31 lbs floating fish food
    1 gallon fish oil
    6 lbs chum starter (a crushed fish food with 6 oz of shrimp or crustacean oil)

Referring back to FIG. 1, FIG. 1 depicts the clip 18 that is attached to the pull cord or draw string 16 of the chum bag 14. This clip 18 is also used to attach the chum bag to a fixed object or lanyard, generally a rope or cable or other similar type of lanyard typically used in the marine fishing industry. This allows the fisherman to decide how to use the bag 14 containing the chum 12. He can keep the bag 14 close by or let it out on a rope. Although clip 18 can be made from a variety of materials, it preferable that it be made from a polymeric or plastic material and that it be a snap type for easy attachment to the draw string 16 and/or rope. Draw string 18 serves as means for closing and securing off the open end of the bag 14 after it has been filled with chum 12. The draw string 18 can also be loosened and opened to add more chum 12 to an existing bag 14.

Bag 14 is a mesh bag designed when in use to self-regulate the dispersion or distribution of the chum 12. As shown in FIG. 3, the essentially parallel intermediate circumferential cords 22 are spaced-apart a desired distance, typically about ½ inch apart. Between each cord 22, a filament 24 is cyclically woven in a generally continuous and cyclical V-shape pattern or M-shape pattern, or what can also be described as a zig-zag pattern. Each filament, as a practical matter, is about 1/64 inch to about 1/32 inch in thickness or width.

The weave of the filament 24 between each pair of cords 22 effectively forms slots 26 in the bag 14 that are vertical top to bottom to the bag 14. This is one of the important features contributing to the performance success of the invention by self-regulating the amount of fish chum 12 released. This controlled release is done by the weight of the chum 12 pulling on the bag 14. With the bag 14 full of chum 12 and lowered in the water with a heavy current, the weight of the fish chum 12 pulls on the bag 14 closing off the slots 26 thus slowing down the release of fish chum 12. That is, when the bag 14 is stretched, the slots 26 close off as the filaments 24 pull close together. Stated another way, when the bag 14 containing the fish chum 12 is put in the water the pulsation of the water action opens and closes these slots 26, thus letting out small amounts of fish chum 12. This action means that a full chum bag 14 will last just as long hanging on the side of an anchored boat or pier as it would be trolled by a boat or dropped in heavy current. The chum bag 14 is also reusable and can be refilled. On the other hand, when the bag 14 is not exposed to any kind of current force or tension, the bag does not stretch and the woven slots 26 are in a more open state, thereby allowing the release of more chum 12. Further, manually pumping the bag 14 containing the chum 12 lets out a larger amount as needed thus giving the fisherman total control of the chumming results. If the water currents are strong or trolling the weight of the chum 12 in the bag pulls the bag straight causing the slots to close thus letting out a smaller amount of chum. This action means that the chum bags last just as long in strong currents as it does bobbing up and down next to an anchored boat. The fisherman therefore has total control of these actions.

Although the bag 14 can be made from a variety of materials, where it is anticipated that chum 12 will be used in a salt water marine environment, it is preferred that the bag 14 be made from a polymeric base material such as polyethelene material or fiberglass.

The vacuum pouch 20 is typically a polymeric laminate material and should be heavy duty. For example, a heavy-duty 5-mil vacuum pouch can be used. After the desired blended chum 12 is placed in the mesh bag 14, the draw string 16 with its attached clip 18 is used to tie off the bag 14. The filled bag 14 is then vacuum sealed using the laminate material or pouch 20. This vacuum sealing operation provides for extended freshness and an extended shelf life of the chum 12. This special fish chum system 10 is therefore an all-inclusive kit and ready for use. Again the fisherman has total control of his chumming needs with the availability of this chum kit 10. This kit 10 eliminates the need for electricity, refrigeration, ice and can be stored in any tackle box.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention.

What is claimed is:

1. A process for making a blended fish chum comprising:
   mixing a first batch of floating dry fish food and fish oil, and allowing said mixed floating dry fish food and fish oil to dry; and
   mixing a second batch of a blend of sinking dry fish food and fish oil, and a fish chum starter, the fish chum starter being a dried mixture of ground mashed sinking dry fish food and crustacean oil, and allowing the second batch to dry,
   wherein when a shallow water performance is desired for the resultant blended fish chum, the first batch and second batch are further mixed at a weight ratio of about 2 parts of the first batch to 1 part of the second batch per pound of total mixture of the blended fish chum, and
   wherein when a deep water performance is desired for the resultant blended fish chum, the first batch and second batch are further mixed at a weight ratio of about 1 part of the first batch to 2 parts of the second batch per pound of total mixture of the blended fish chum.

2. The process according to claim 1, wherein the crustacean oil is added to the sinking fish food of the fish chum starter, at a rate of about 1 to 1.5 ounces per pound of mashed sinking fish food.

3. The process according to claim 1, wherein the fish oil is added to the sinking fish food of the sinking fish food blend at a rate of about 1 ounce per pound of sinking fish food.

4. The process according to claim 1, wherein the fish oil is added to the floating fish food of the first batch at a rate of about 1.5 ounces per pound of floating fish food.

5. The process according to claim 3, wherein the fish oil is 100 percent Menhaden fish oil.

6. The process according to claim 4, wherein the fish oil is 100 percent Menhaden fish oil.

7. The process according to claim 1, wherein the ratio of fish chum starter to sinking fish food to which the fish oil has been added in the second batch is about 3 pounds of fish chum starter to 50 pounds of sinking fish food.

8. The process according to claim 1, further comprising:
   inserting a desired quantity of the corresponding resultant blended fish chum in a mesh bag and closing the mesh bag using means for closing said mesh bag.

9. The process according to claim 8, wherein the mesh bag further comprises:
   means for attaching a lanyard to the mesh bag when in use, said means for attaching the lanyard being detachably attached to the means for closing the mesh bag.

10. The process according to claim 8, wherein the mesh bag is made from polymeric filament material and is woven to so as to form slotted openings, the slotted openings forming a plurality of generally V-shaped openings.

11. The process according to claim 10, wherein when the mesh bag is placed in a condition that stretches the bag, the generally V-shaped openings close to reduce a dispersion of the dried blended fish chum in the water, when the mesh bag is placed in a condition that allows for relaxation of the bag, the generally V-shaped openings open to allow an increased dispersion of the dried blended fish chum in the water.

12. The process according to claim 10, wherein the mesh bag includes a plurality of spaced-apart cords circumferentially surrounding the mesh bag, between each of which the generally V-shaped openings are formed by the woven filament material.

13. The process according to claim 8, wherein the plurality of spaced-apart cords are each spaced apart about ½ inch.

14. The process according to claim 8, wherein the means for closing the mesh bag is a draw string.

15. The process according to claim 9, wherein the means for attaching the lanyard to the mesh bag is a clip.

16. The process according to claim 8, further comprising:
vacuum sealing the closed mesh bag containing the desired quantity of the corresponding resultant blended fish chum to ensure long term freshness and non-refrigerated storage of the desired quantity of the corresponding resultant blended fish chum, until ready for use.

\* \* \* \* \*